(12) United States Patent
Cohen

(10) Patent No.: US 6,233,567 B1
(45) Date of Patent: *May 15, 2001

(54) METHOD AND APPARATUS FOR SOFTWARE LICENSING ELECTRONICALLY DISTRIBUTED PROGRAMS

(75) Inventor: Aaron Michael Cohen, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/920,679

(22) Filed: Aug. 29, 1997

(51) Int. Cl.[7] ........................................................ H04L 9/00
(52) U.S. Cl. ................................................................ 705/59
(58) Field of Search .................................. 380/21, 23, 49, 380/30; 705/54, 51, 59, 52

(56) References Cited

U.S. PATENT DOCUMENTS

| | | | |
|---|---|---|---|
| 5,222,134 | * 6/1993 | Waite et al. | 705/59 |
| 5,337,357 | * 8/1994 | Chou et al. | 380/4 |
| 5,490,216 | * 2/1996 | Richardson, III | 705/59 |
| 5,553,143 | * 9/1996 | Ross et al. | 705/59 |
| 5,555,304 | * 9/1996 | Hasebe et al. | 380/4 |
| 5,586,186 | * 12/1996 | Yuval et al. | 380/30 |
| 5,638,443 | * 6/1997 | Stefik et al. | 705/54 |
| 5,651,064 | * 7/1997 | Newell | 380/4 |
| 5,724,425 | * 3/1998 | Chang et al. | 705/52 |
| 5,737,419 | * 4/1998 | Ganesan | 380/21 |
| 5,758,068 | * 5/1998 | Brandt et al. | 395/186 |
| 5,926,549 | * 7/1999 | Pinkas | 713/168 |

FOREIGN PATENT DOCUMENTS

0795809 * 9/1997 (EP).

OTHER PUBLICATIONS

Albert et al; "Combatting Software Piracy by Encryption and Key Management", Apr. 1984; Computer; pp. 68–73.*

* cited by examiner

Primary Examiner—Tod Swann
Assistant Examiner—Matthew Smithers
(74) Attorney, Agent, or Firm—Blakely, Sokoloff, Taylor & Zafman LLP

(57) ABSTRACT

A method including the steps of receiving a registration identifier for a client; generating a registration key based on the registration identifier; and transmitting the registration key to the client.

21 Claims, 4 Drawing Sheets

METHOD AND APPARATUS FOR SOFTWARE LICENSING ELECTRONICALLY DISTRIBUTED PROGRAMS

BACKGROUND OF THE INVENTION

1. Field of the Invention

The present invention relates to the field of use of computer software registration. More particularly, the present invention relates to secure registration of computer software.

2. Description of Related Art

The use of wide-area-networks such as the Internet to distribute software has become a very popular way to distribute software. The software can be programmed to be—until a license is purchased—either fully functional for a "trial period" of a certain duration, or partially functional. Providing potential customers the ability to download functional versions of a particular software allows access to an audience base that is limited only by the means of distribution (e.g., the size of the audience which has access to the Internet).

In addition, using networks to distribute demonstration or "demo" software is cost effective for the software company, as the company does not need to first place the demo software onto a distribution medium such as floppy disks or compact disk read-only-memory (CD-ROM) disks. Moreover, the company does not have to create or pay for packaging, nor maintain an inventory. The cost saving is especially beneficial in helping companies save marketing funds, which can be invested in other programs.

However, these cost savings disappear when the company has to ensure that customers who download the software pay for the software. Companies which put functionally limited versions of their software on the network requires a customer to send in payment for the software before the customer is sent a fully functional version. These companies must maintain a stock of packaged software, exactly the problem that a network-based distribution method attempts to solve.

Companies which put a time limit or other restrictions on their software require the customer to pay for a license before the customer is sent a "key code". The key code is entered into the program, which then unlocks any restrictions. The problem associated with this scheme is that the same key code can be used for any copy of the software, so multiple individuals can unlock their respective copies of the software by simply purchasing one license and distributing the received key code amongst themselves.

Thus, it would be preferrable to have a software distribution scheme that overcomes the problems associated with these methods.

SUMMARY OF THE INVENTION

A method including the steps of receiving a registration identifier for a client; generating a registration key based on the registration identifier; and transmitting the registration key to the client.

DETAILED DESCRIPTION OF THE INVENTION

Figure 1:
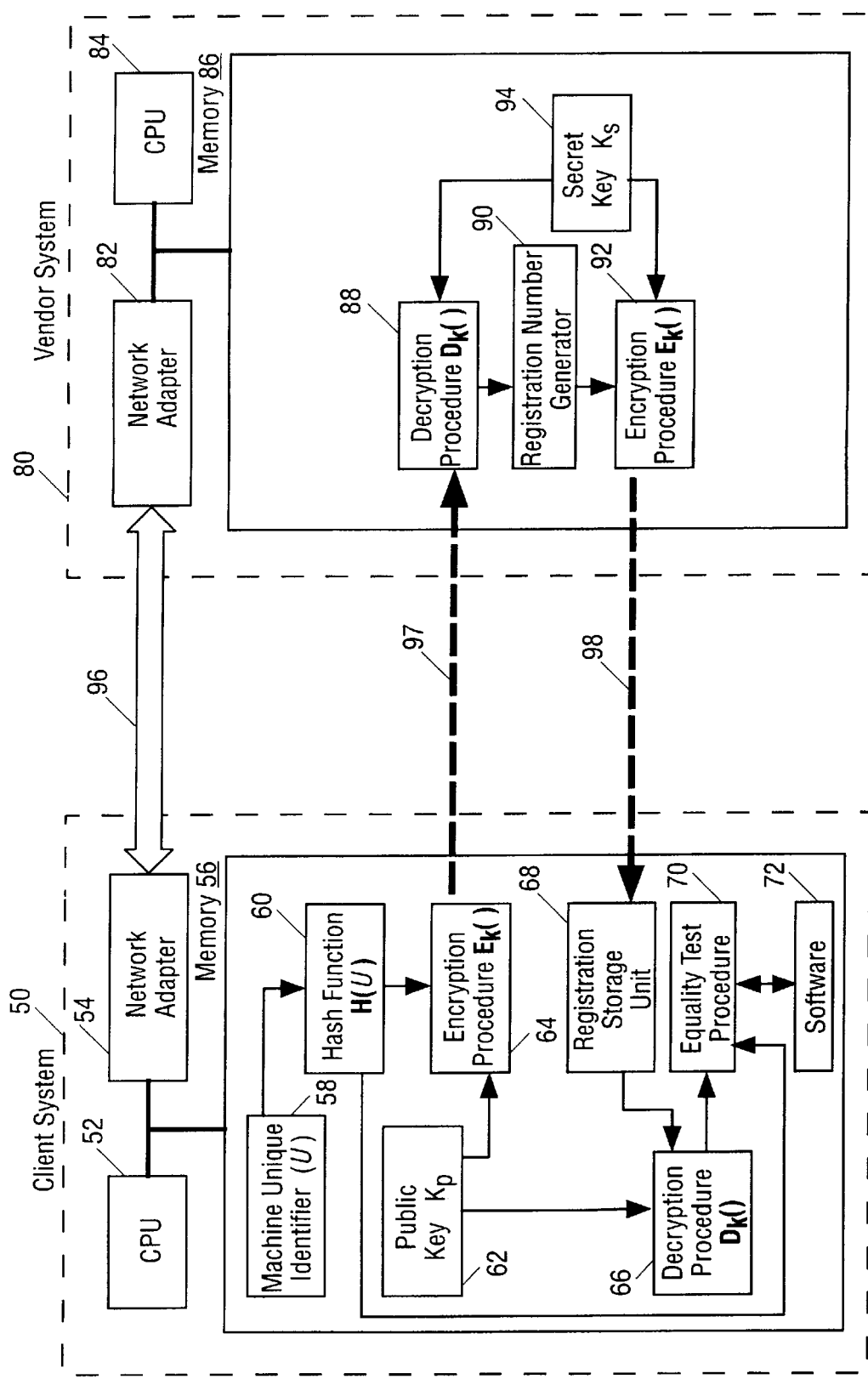
FIG. 1 is a block diagram of a client system and a vendor system configured in accordance to a preferred embodiment of the present invention.

The present invention provides a method and apparatus for distributing software licenses. For purposes of explanation, specific embodiments are set forth to provide a thorough understanding of the present invention. However, it will be understood by one skilled in the art, from reading this disclosure, that the invention may be practiced without these details. Further, although the present invention is described through the use of software distribution over the Internet, most, if not all, aspects of the invention apply to software distribution in general. Moreover, well-known elements, devices, process steps and the like are not set forth in detail in order to avoid obscuring the present invention.

Through the use of public key cryptography, one-way hash functions and unique machine identification, software registration is provided which is individualized to a particular computer. Thus, software registration is "locked-in" to a particular computer and cannot be used on another computer—preventing the sharing of key codes.

In order to describe this system of software distribution, explanation is first provided below for public key cryptography, one-way hash functions and unique machine identification.

Public Key Cryptography

Public key cryptography provides the ability for two parties to send information securely between themselves. Unlike symmetrical cryptography, which requires a shared secret key, public key cryptography uses one key, a "public" key, to encode information and another complementary key, a "private key" to decode encrypted information. The security of the system lies in the method used to create the key pair and the belief that it is very difficult to determine the private key from the public key.

In use, a user publishes the public key and keeps the private key secret. Parties wishing to send a message to the user encrypt the message with the user's published public key and send it to the user. Upon receiving the encrypted message, the user decrypts the message with the user's private key, thereby recovering the original message.

The user can also "sign" a document by using the user's private key. The user would encrypt the message with the private key, and other parties would decrypt the message with the user's public key. Only documents encrypted with the user's private key will be intelligible when decrypted with the user's public key.

Mathematically, encryption is represented by:

$$C = E_{k1}(M)$$

and decryption is:

$$M = D_{k2}(C),$$

where M is the original message, C is the encrypted message, k1 is the public key, k2 is the private key, E() is the encryption function and D() is the decryption function. For signing of documents, the keys used would be reversed.

One-Way Hash Functions

A one-way hash function is a function which cannot be easily reversed. Specifically, given an input, an output is easy to generate, but given the output, the input is practically impossible to reconstruct. Also, given an output, it would be very difficult to generate input data which hashes to the output value. One-way hash functions can output more, less, or the same amount of information (e.g., number of bits) from a given input. To be useful, the hash function should return practically unique values for a given input. Usually, the hash values have less information than the input data.

One-way hash functions are useful in constructing "signatures" of documents. For example, if user A has a document, and user B wants to prove to user A that he has the same document, user B can run an agreed upon one-way hash function and send the result to user A, who can run the same one-way hash function and compare hash values. If they match, user A has strong evidence that user B has a copy of the same document.

Mathematically, the hash function is represented by:

$$S=H(M)$$

where M is the original message, H() is the one-way hash function, and S is the signature of the message.

Unique Machine Identification

Modern operating systems support remote procedure calls (RPC), which requires a unique method of identifying each machine on a network. Thus, most operating systems include a way of generating universal unique identifiers (UUID), which are unique in time and space. These UUID's have a well defined layout and have preallocated portions for location information, time information, and user defined information. Every UUID created on a particular machine will have the same values for the location bits. Therefore, these bits can be used to uniquely identify a particular machine.

Software Registration

FIG. 1 is a block diagram of a client system 50 and a vendor system 80 configured in accordance with one embodiment of the present invention.

Client 50 contains a CPU 52, which is a general purpose processor, coupled to a network adapter 54. Also coupled to network adapter 54 and CPU 52 is a memory 56, which stores the data and procedures which CPU 52 uses to operate.

Memory 56 of client system 50 contains a machine unique identifier U 58; a hash function H(U) 60; a public key Kp 62; an encryption procedure $E_k()$ 64; a decryption procedure $D_k()$ 66; a registration storage unit 68; an equality test procedure 70 and software 72.

As discussed above, machine unique identifier U 58 is a number that is unique to client system 50, and the size of machine unique identifier U 58 can be of any length, as generated by client system 50.

Also, as discussed above, encryption procedure $E_k()$ 64 decryption procedure $D_k()$ 66 are used to encrypt and decrypt, respectively, messages which are received from vendor system 80.

Public key $K_p$ is used with encryption procedure $E_k()$ 64 to create an encrypted version of a one-way hashed machine unique identifier U 58, as described below. Public Key $K_p$ 62 is also used with decryption procedure $D_k()$ 66 to authenticate any registration keys received from vendor system 80.

Registration storage unit 68 is used to store the registration key received from vendor system 80 for enabling features of software 72.

Equality test procedure 70 is used to verify that the decrypted version of the registration key stored in registration storage unit 68 is equivalent to the one-way hashed value of machine unique identifier (U) 58, as generated by hash function H(U) 60. Equality test procedure 70 is interfaced with software 72 to enable/disable functionality of software 72 based on the output of equality test procedure 70, as discussed below.

Continuing to refer to FIG. 1, vendor system 80 contains a network adapter 82 which is used to communicate with network adapter 54 of client system 50 through a network 96. Network 96 can be a general purpose network such as the Internet or a local-area-network containing two or more systems.

Vendor system 80 also contains a CPU 84, which can be a general purpose processor, coupled to network adapter 82. It is to be noted that CPU 84 and CPU 52 of client system 50 can also be custom integrated circuits.

Also coupled to network adapter 82 and CPU 84 is a memory 86. Memory 86 of vendor system and memory 56 of client system 50 can also be general purpose data storage devices or custom data storage devices such as integrated circuits and can be built into CPU 84 of vendor system 80 and CPU 52 of client system 50, respectively.

Memory 86 of vendor system 80 contains a decryption procedure $D_k()$ 88; a registration number generator 90; and encryption procedure $E_k()$ 92, and secret key $K_s$ 94.

Decryption procedure $D_k()$ 88 is functionally equivalent to decryption procedure $D_k()$ 66 of client system 50. Similarly, encryption procedure $E_k()$ 92 is functionally similar to encryption procedure $E_k()$ 64 of client system 50. However, vendor system 80 will use secret key $K_s$ 94 and decryption procedure $D_k()$ 88 to decrypt the messages generated by encryption procedure $E_k()$ 64 of client system 50 (client system 50 using public key $K_p$). Also, vendor system 80 will use secret key $K_s$ 94 in encryption procedure $E_k()$ 92 to authenticate messages which are sent to decryption procedure $D_k()$ 66 of client system 50.

Registration number generator 90 is used to verify user payment information CC which is received from client system 50. After payment is made, registration number generator will allow vendor system 80 to generate a registration key.

A first dotted line 97 is used to logically represent the sending of data from encryption procedure $E_k()$ 64 of client system 50 to decryption procedure $D_k()$ 88 of vendor system 80, while a second dotted line 98 is used to logically represent the sending of encryption procedure $E_k()$ 92 of vendor system 80 to registration storage unit 68 of client system 50. The actual data is sent over network 96 through the use of network adapter 54 and network adapter 82.

It is to be noted that although software 70 is shown to be a separate functional block in FIG. 1, in alternate embodiments, software 70 contains any combination of the functional and storage elements contained in memory 56 of client system 50.

Figure 2:
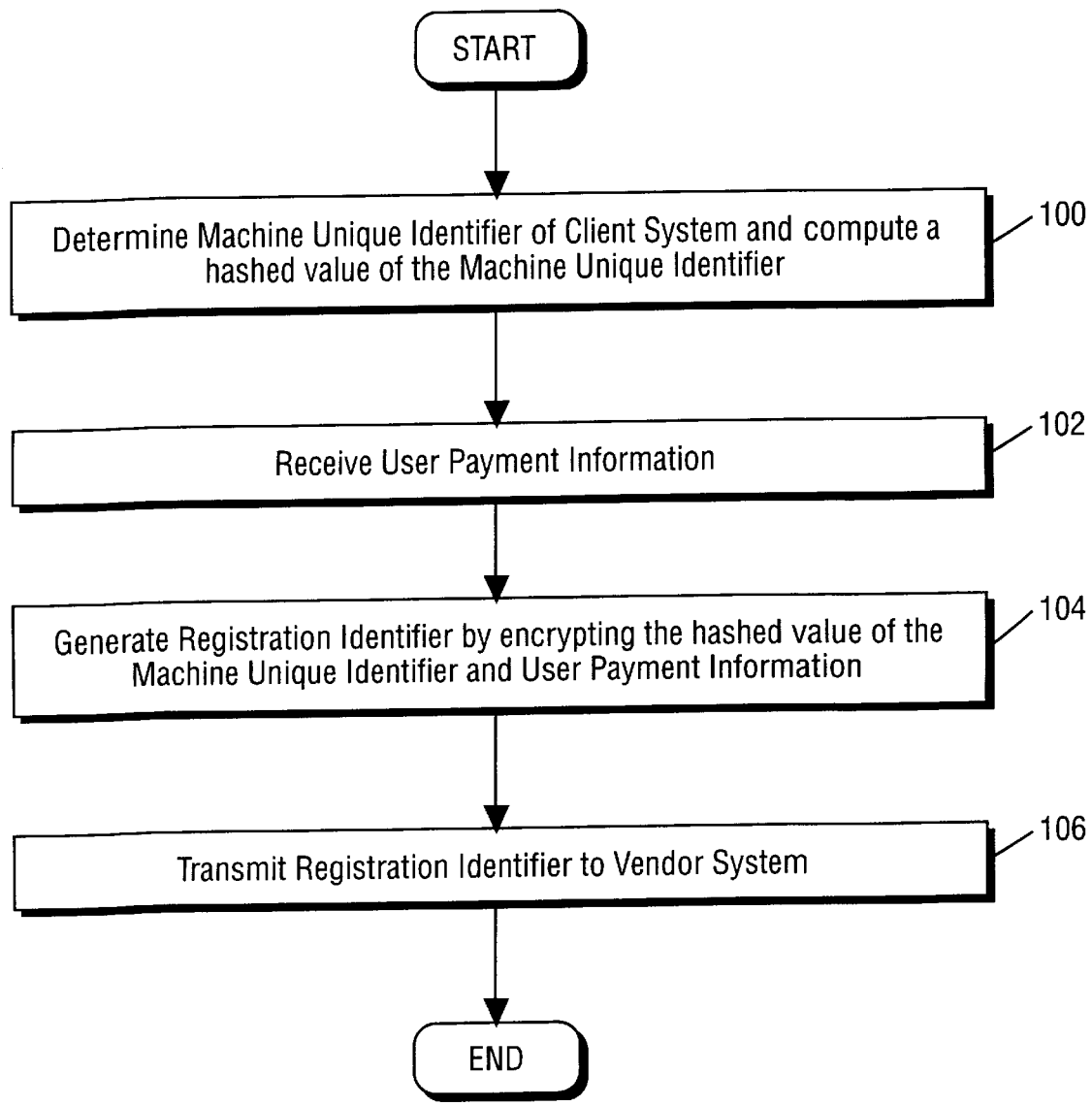
FIG. 2 is a flow diagram of the operation of the client system for initiating a request for registration of a software license.

FIG. 2 is a flow diagram of the operation of the software registration system, as shown in FIG. 1, where the user decides to register the product.

In block 100, client system 50 first determines machine unique identifier U 58. As noted above, machine unique identifier U 58 is used to uniquely identify client system 50 and is generated by using a built-in function of the operating system. After machine unique identifier U 58 is determined, client system 50 creates a one-way hashed version of machine unique identifier U using hash function H(U) 60. The generation of the one-way hashed version of the machine unique identifier in block 100 provides a practically unique registration code which does not allow the vendor access to any sensitive machine information, such as the network card ID number. The use of one-way hash function H(U) allows the registration identifier to be a fixed size, independent of how many bits of information are available in machine unique identifier U 58. A fixed size registration identified is useful for multi-platform products as each type of platform may have a different number of location specific bits in the UUID.

In block 102, client system 50 receives user payment and other transaction specific information (CC). This is information appended to the one-way hashed version of the machine unique identifier and is whatever transaction specific information the vendor requires, such as the user's name and credit card number.

In block 104, client system 50 generates a registration identifier R by using this formula:

$$M=H(U)+CC$$

$$R=E_{k_p}(M)$$

where H( ) is hash function 60; U is machine unique identifier 58; CC is private, transaction specific information, such as the user's name and credit card number; M is the one-way hashed machine unique identifier with private user data appended (i.e., the "message"); $E_k$( ) is encryption procedure 64; $k_p$ is the published, public key; 62 and R is the generated registration identifier. As this information is encrypted using the published public key (Kp), it can only be decrypted and read by vendor system 80 with the private key ($K_s$).

In block 106, the registration identifier (R) is transmitted to vendor system 80. This can be done automatically by software 72, which is contained on client system 50 over the Internet, or a text representation of the registration identifier (R) can be generated and sent to the vendor to be processed on vendor system 80.

As described, the information contained in registration identifier (R) is encrypted before it is transmitted, so it can be transmitted using any method, either securely or non-securely.

Figure 3:
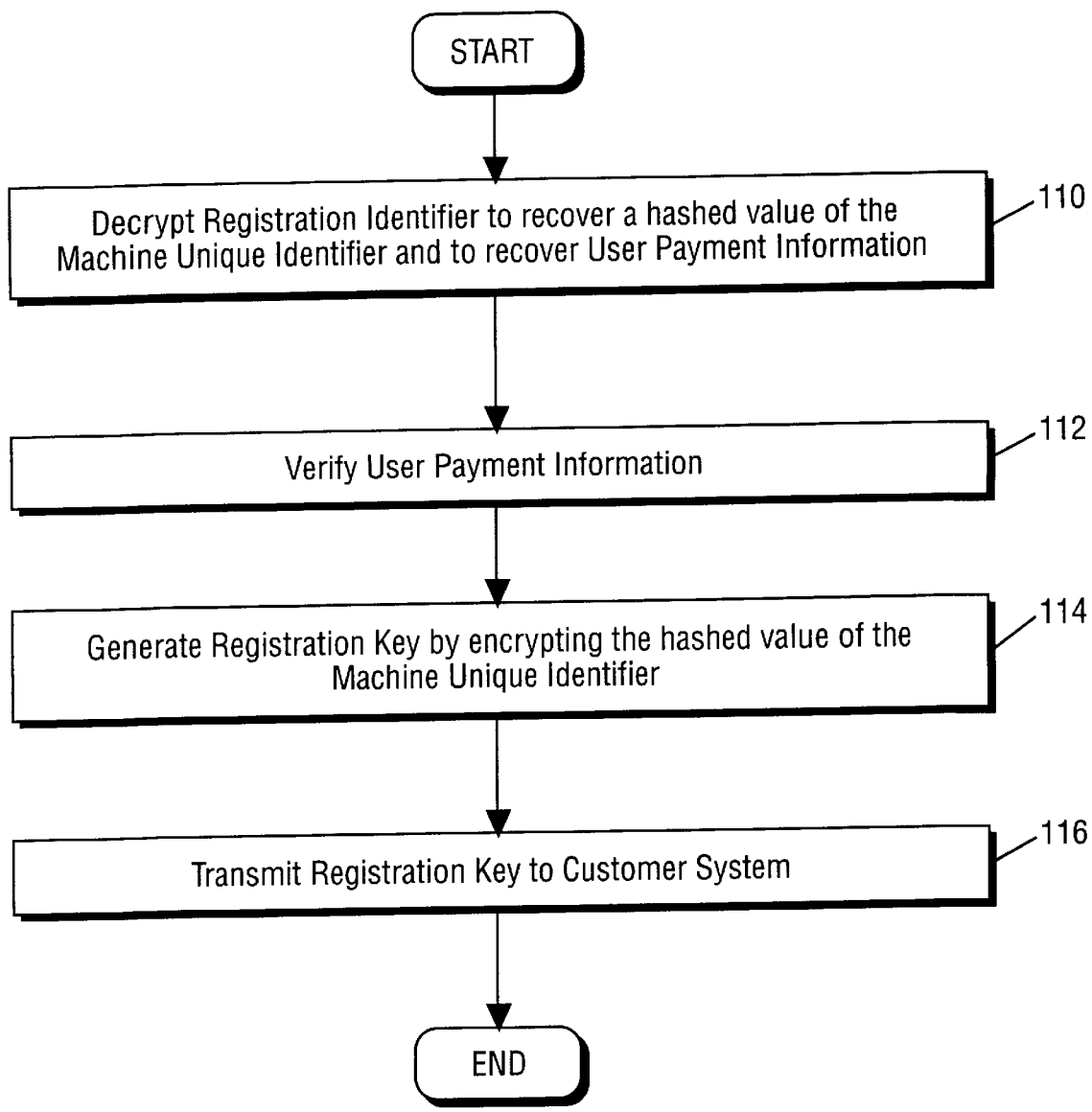
FIG. 3 is a flow diagram of the operation of the server system in receiving the request of the client system and generating a registration key for the software on the client system.

FIG. 3 illustrates the operation of vendor system 80 where the client system 50 has transmitted registration identifier (R).

In block 110, vendor system 80, upon receiving the registration identifier (R), computes:

$$M=D_{k_s}(R)$$

$$H(U)+CC=M$$

where R is the registration code; M is the one-way hashed machine identifier with private user data appended, recovered by decrypting R (this is split into two parts to recover H(U) and CC); $D_k$( ) is decryption procedure 88; and $k_s$ is the secret, private key 94.

In block 112, the private user information (CC), is used to verify payment for the software. This verification can be as simple as processing a credit card transaction or verifying that the user has sent in payment.

In block 114, after payment is received, vendor system 80 will generate:

$$T=E_{k_s}(H(U))$$

where $E_k$( ) is encryption procedure 92 and T is the generated registration key.

It is to be noted that as registration key (T) is based on a machine identifier which is unique for client system 50, even if registration key (T) is compromised, it could not be used for another machine.

In block 116, vendor system 80 will transmit registration key (T) to client system 50. As stated above, as registration key (T) is an encrypted value of the one-way hashed value of machine unique identifier U 58, registration key (T) can be transmitted using any means, whether it is secure or unsecure.

Further, as registration key (T) is specific for client system 50 and cannot be used by another system, the security of the key system can be compromised and the protection provided by the system would still remain.

Figure 4:
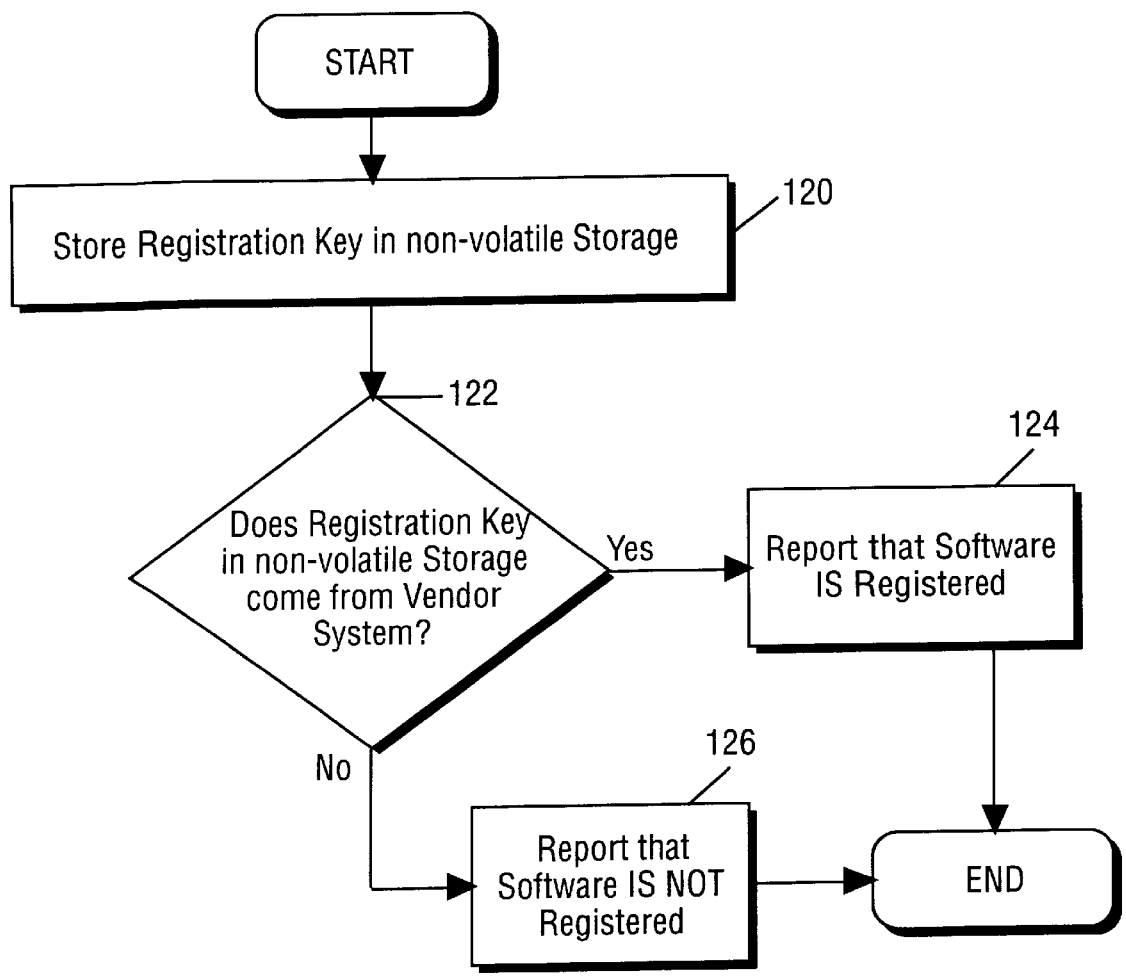
FIG. 4 is a flow diagram of the operation of the client system after it has received the registration key for the software.

FIG. 4 illustrates the operation of client system 50 after client system 50 has received registration key (T).

In block 120, client system 50 will store registration key (T) in registration storage unit 68 so that it can be accessed when needed. When software 72 needs to expose or hide functionality based on the registration status, the current key is loaded from this location, decrypted, and checked for correctness as discussed in block 122. Also, the next time software 72 runs or needs to decide if software 72 is a registered copy, client system 50 will go to block 122.

In block 122, equality test procedure 70 of client system 50 will determine if registration key (T) comes from vendor system 80 by checking to see if the following holds true:

$$D_{k_p}(T)=H(U)$$

where: $D_k$( ) is decryption procedure 88; $k_p$ is the published, public key 62; H( ) is the one-way hash function 60; U is machine unique identifier 58; and T is the registration key.

If the equality holds true, then operation will continue with block 124. Otherwise, operation will continue with block 126.

In block 124, client system 50 will allow any functionality in software 72 that was previously disabled.

In block 126, as client system 50 has detected that registration key (T) is not received from vendor system 80 or is not valid, any functionality of software 72 that is not accessible to non-paid users remain locked or hidden.

It is to be noted that any public key cryptography algorithm that can transmit arbitrary messages will work in the system. However, the security of the system is only as secure as the cryptography algorithm. For public key cryptography systems, security increases as more bits are added to the key (i.e., the key length is increased). In a preferred embodiment, the key length is at least 512 bits.

In order to prevent an attacker from trying to break the licensing scheme by modifying the executable code containing the check which disables functionality, several alternate embodiments are proposed.

First, all debug information should be removed from any executable before distribution. This makes it harder for the attacker to follow the flow of control which checks the registration code.

Second, multiple places in the code can check for the existence of a correct registration key (T). This makes it harder to bypass all of the registration checks.

Third, the registration checking code can be obfuscated, making it hard to follow and change. This can be made complicated enough that it would be more cost effective to just license the software legally.

Fourth, for even more security, the software itself could be encrypted with the private key and loaded, decrypted and run using a second loader program. This method would be secure against all but the dumping of the binary image of the running executable out to a disk file and reconstructing a executable program file from a binary image.

For maximum security, the operating system (OS) itself could be enhanced to only execute encrypted executable files. The OS would be shipped with the decryption key, but the encryption key would remain secret. To execute a program, it would have to be decrypted by the internal OS key. Since only the OS manufacturer would have the encryption key, only programs encrypted by the OS manufacturer could be run. Obviously, this level of security would affect the way that software could be written and used. However some usage models, such as game machines where most software comes from one manufacturer and no software is written on the executing machine itself, could use this security method.

In one alternate embodiment, time-limited licenses can be granted. Instead of simply decrypting and re-encrypting the unique machine identifier, an expiration date is added to the message. When client system 50 checks registration key (T), client system 50 also decrypts the expiration date and checks if the license has expired.

In the alternate embodiment, the following functions would be used on vendor system 80:

$$M = Dk_s(R)$$

$$H(U) + CC = M$$

$$T = Ek_s(H(U) + V)$$

Where: R is the registration code; M is the one-way hashed machine identifier with private user data appended, recovered by decrypting R (this is split into two parts to recover H(U) and CC); V is the expiration date; $E_k(\ )$ is the encryption procedure; $D_k(\ )$ is the decryption procedure; $k_s$ is the secret, private key; and, T is the generated registration key.

In addition, on client system 50, the following function would be used:

$$Dk_p(T) = K, V$$

and a check performed to determine if the two following conditions hold true:

$$K = H(U)$$

and,

V has not expired. where: $D_k(\ )$ is the decryption procedure; $k_p$ is the published, public key; $H(\ )$ is the one-way hash function; U is the machine unique identifier; T is the registration key; K is the machine identifier portion of the decrypted registration key; and V is the expiration date portion of the decrypted registration key.

It is to be noted that the unique identifier does not have to be hashed before being transmitted. In addition, no private information has to be appended for payment purposes. In another alternate embodiment, only the unique identifier is transmitted.

In yet another alternate embodiment, the unique identifier, U, is not machine specific but specific in another way, such as user or binary specific. A software distribution site could be set up to download executables that are identical except for an internal identifier.

Alternatively, the software could be distributed with an installation program that set the executable's internal unique ID to some time or location specific value. Each user would get an equivalent binary file that required a different registration key, but the registration process and key verification would be exactly as in the basic system. This would allow a user to install the software on multiple machines but not share the registration key with other users. If the unique identifier could be something person specific, such as a fingerprint, a voice print, or a handwriting signature, this alternate embodiment could be very attractive.

Using electronic "money", the entire process could be automated. A Web server could process the payment with the registration identified and send the registration key back to the user (all over a secure channel such as Secure Socket Layer) within a single transaction.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method comprising:
   receiving an encrypted registration identifier for a client, said registration identifier contains an one-way hashed value of a machine unique identifier for said client, said registration identifier being encrypted using a public key;
   decrypting said registration identifier using a private key that is matched to said public key to retrieve the one-way hashed value;
   generating a registration key based on said registration identifier by encrypting the retrieved one-way hashed value; and
   transmitting said registration key to said client.

2. The method of claim 1 wherein said registration identifier further contains user payment information.

3. The method of claim 2, further comprising decrypting said registration identifier to retrieve said user payment information.

4. The method of claim 3, further comprising verifying payment using said user payment information.

5. The method of claim 1 further comprising retrieving the one-way hashed value from said registration key by the client; and
   comparing the client retrieved one-way hashed value to a client generated one-way hashed value.

6. The method of claim 1, wherein said generating further comprises encrypting the one-way hashed value along with an expiration time indicator.

7. A method comprising:
   determining a machine unique identifier;
   generating an one-way hashed value of said machine unique identifier;
   encrypting said one-way hashed value of said machine unique identifier to generate a registration identifier using a public key of a server;
   transmitting said registration identifier to said server;
   receiving a registration key from the server, the registration key contains an encrypted form of the one-way hashed value retrieved by the server;
   retrieving by a client the one-way hashed value from the registration key; and
   comparing the client retrieved one-way hashed value to a client-generated one-hashed value.

8. A method comprising:
   receiving a registration key;
   storing said registration key in memory;
   retrieving a one-way hashed value of a machine unique identifier from said registration key;
   generating a one-way hashed value of a machine unique identifier from said client;
   comparing said retrieved one-way hashed value of said machine unique identifier with said generated one-way hashed value of said machine unique identifier; and, providing a software enable signal only if said retrieved one-way hashed value of said machine unique identifier is equal to said generated one-way hashed value of said machine unique identifier.

9. The method of claim 8, further comprising:

retrieving an expiration time indicator from said registration key; and, eliminating the provision of said software enable signal if said expiration time indicator indicates that said registration key has expired.

10. An apparatus comprising:

a processor;

a memory coupled to said processor and configured with instructions to cause said processor to:

receive an encrypted registration identifier for a client, said registration identifier contains an one-way hashed value of a machine unique identifier for said client, said registration identifier being encrypted using a public key;

decrypt said registration identifier using a private key that is matched to said public key, to retrieve the one-way hashed value;

generate a registration key based on said registration identifier by encrypting the one-way hashed value retrieved from said registration identifier; and, transmit said registration key to said client.

11. The apparatus of claim 10, wherein said registration identifier contains an one-way hashed value of a machine unique identifier for said client.

12. The apparatus of claim 10 wherein said registration identifier further contains user payment information.

13. The apparatus of claim 12, where said memory contains further instructions configured to cause said processor to decrypt said registration identifier to retrieve said user payment information.

14. The apparatus of claim 13 where said memory contains further instructions configured to cause said processor to verify payment using said user payment information.

15. The apparatus of claim 10, where, to generate said registration key based on said registration identifier, said memory contains further instructions configured to cause said processor to encrypt the retrieved one-way hashed value along with an expiration time indicator.

16. An article of manufacture comprising:

a machine-readable medium having instructions which, when executed by a machine, cause the machine to receive an encrypted registration identifier for a client, said registration identifier contains a one-way hashed value of a machine unique identifier for said client, said registration identifier being encrypted using a public key;

decrypt said registration identifier using a private key that is matched to said public key to retrieve the one-way hashed value;

generate a registration key based on said registration identifier by encrypting the retrieved one-way hashed value into the registration key; and transmit said registration key to said client after verifying payment.

17. The article of manufacture of claim 16 wherein the machine-readable medium includes further instructions which cause the machine to process a user payment, based upon user payment information retrieved from the registration identifier, before transmitting the registration key.

18. The article of manufacture of claim 17 wherein the machine readable medium includes further instructions which cause the machine to include an expiration time indicator when generating the registration key.

19. An article of manufacture comprising:

a machine-readable medium having instructions which, when executed by a client machine, cause the machine to (a) determine a machine unique identifier for said machine;

(b) generate a one-way hashed value of said machine unique identifier;

(c) encrypt said one-way hashed value to generate a registration identifier using a public key of a server;

(d) transmit said registration identifier to said server;

(e) receive a registration key from the server, the registration key contains an encrypted form of the one-way hashed value;

(f) retrieve the one-way hashed value from the registration key;

(g) determine a machine unique identifier for said machine and generate a one-way hashed value thereof; and (h) compare the retrieved one-way hashed value in (f) to the one-way hashed value in (g).

20. The article of manufacture of claim 19 wherein the machine-readable medium includes further instructions which cause the machine to provide a software enable signal only if the comparison in (h) indicates that the one-hashed value retrieved in (f) is equal to the one generated in (g).

21. The article of manufacture of claim 20 wherein the machine-readable medium includes further instructions which cause the machine to retrieve an expiration time indicator from the registration key, and not provide the enable signal if the expiration time indicator indicates that the registration key has expired.

* * * * *